Dec. 1, 1942.　　　　R. L. CARR　　　　2,303,789
CONVERTIBLE VEHICLE BODY
Filed Nov. 30, 1939　　　6 Sheets-Sheet 3

Inventor
Raymond L. Carr

Inventor
Raymond F. Carr

Dec. 1, 1942.  R. L. CARR  2,303,789
CONVERTIBLE VEHICLE BODY
Filed Nov. 30, 1939  6 Sheets-Sheet 5

Inventor
Raymond L. Carr

Patented Dec. 1, 1942

2,303,789

UNITED STATES PATENT OFFICE 2,303,789

CONVERTIBLE VEHICLE BODY

Raymond L. Carr, Boston, Mass.

Application November 30, 1939, Serial No. 306,796

13 Claims. (Cl. 296—107)

The present invention relates to improved vehicle body constructions of the convertible type, provided with rigid shells or tops movable into lowered positions. In general, this invention provides an improved body of the general type disclosed in my copending application Serial No. 35,610, filed August 10, 1935, now Patent No. 2,181,869, dated December 5, 1939.

Heretofore, vehicle bodies having rigid, lowerable tops have been provided with movable closures extending substantially behind the corresponding raised tops. Thus, for example, the rear deck might comprise a large swinging door which had to be opened to permit movement of the top to lowered position, or the front of the deck might provide a movable lid extending a substantial distance behind the raised top. One important feature of the present invention involves the arrangement of the top structure and its supporting and guiding means so that such a movable closure is not necessary and so that the opening through which the top passes to raised position need not extend either behind or laterally beyond the raised top structure.

In accordance with this invention, the top may be provided with surfaces inclined relative to its path and engageable with corresponding surfaces on the body, thus to facilitate accurate positioning of the rear of the raised top. While it is possible to have the upstanding walls of the top contiguous to the edges of the deck that surround the opening through which the top passes, I have found it advantageous to provide narrow outstanding panel sections at the sides of the top which form parts thereof and which are movable therewith so that the opening through which the top passes may be somewhat larger than its upstanding portion, thus permitting more advantageous shaping thereof while allowing adequate clearance, as will be more fully discussed.

An arrangement of this character is advantageous since it avoids the cost of providing a movable door or lid of substantial dimensions and especially since it avoids the necessity for manipulating such a door or lid whenever the top is to be raised or lowered. Since the opening through which the top passes is enclosed when the top is raised, this opening need not be provided with any closure, but I prefer to provide a flexible apron which may be secured over this opening, at least when the top is lowered, thus affording a neater appearance and providing weather protection for the front of the lowered top and adjoining parts.

Not only have I provided guiding and supporting structure to permit movement of the top in the manner described without necessitating the provision of a movable door or lid, but I also have arranged the guiding and supporting structure so that the movement of the top is facilitated. To this end, the center of gravity of the top does not deviate greatly from a straight-line path, and it is not necessary to lift or manually swing the front end of the top shell upwardly as it moves from its lowered position into engagement with the windshield standards. Furthermore, the guiding and supporting structure preferably is arranged so that the front of the top is moved over the highest parts of the windshield standards as the top nears its raised position.

Further to facilitate movement of the top from lowered to raised position, I have provided improved assist mechanism. In order to prevent rapid movement of the top to its lowered position under the influence of gravity, one-way brake means of a simple structure preferably may be associated with this assist mechanism.

Preferably a top of this character is provided with a rear opening and includes a panel movable independently of the body portion of the top into lowered position. The present invention shows arrangements permitting movement of such a panel without necessitating the provision of an opening in the deck which extends behind the raised top. The panel may either be swung to a lowered position or may be provided with suitable guide means permitting it to be lowered to a position above the shell.

In general, the structural details of the present invention cooperate with the aforenamed features in simplifying the procedure necessary in lifting or lowering the top and in affording a trouble-free, simple, and dependable construction.

A vehicle body of the type provided herein may be generally similar to that disclosed in my above-identified application, preferably including a passenger compartment provided with a rear seat having an upstanding back 1 in front of a rear deck, designated in general by the numeral 2. This deck may include a rear door 3 to afford access to a storage compartment 4. Preferably the space within the deck may communicate with the chambers behind the rear wheels of the vehicle and within the tails or rear portions of longitudinally extending housings in the general manner disclosed in my above-identified application and in application Serial No. 306,794, filed on even date herewith, although if desired such chambers may be provided by rearward extensions of the mud-guards of the vehicle.

The vehicle may be provided with a top having a body portion or shell T which extends over the major portion of the passenger compartment and engages the windshield standards at the front of the vehicle. This top or shell may be movable into a lowered position, shown in dot and dash lines in Fig. 1, wherein it is inclined upwardly and forwardly relative to its raised position and is in generally nested relation to the deck 2, in other words, is roughly parallel to the inclined outer wall of the deck. Inclined guides G, which will be described in detail, are arranged in each side of the deck to direct the shell T from lowered to raised position or vice versa. The lower ends of these guides may be disposed in the chambers behind the rear wheels of the vehicle.

The shell preferably is provided with a rear opening which permits access to the storage compartment 4 when the shell is lowered. When the shell is raised, a rear panel 10, forming part of the top, may close this opening. As shown, the panel 10 may be swung to a lowered position wherein it is inclined upwardly and rearwardly rather than upwardly and forwardly as in its raised position; for example, the panel may swing through an angle somewhat greater than a right angle. In front of the lowered panel 10, and preferably supported by the rear seat back, may be a suitable storage basket 14, accessible from the interior of the vehicle when the top is raised.

As will be described in greater detail, I may provide suitable assist mechanism for aiding the manual movement of the top to its raised position. Such mechanism may comprise similar assemblies at each side of the deck, including springs 20 and pulley assemblies 21 and 22. One important feature of the present invention, which results from the improved arrangement of the guiding and supporting structure, involves the movement of the shell from its lowered to its raised position so that the path of the center of gravity of the shell does not deviate substantially from a straight line. The heavy dash line between the points C, $C^1$ and $C^2$ in Fig. 1 shows the path of movement of this center of gravity.

Figures 1, 2:
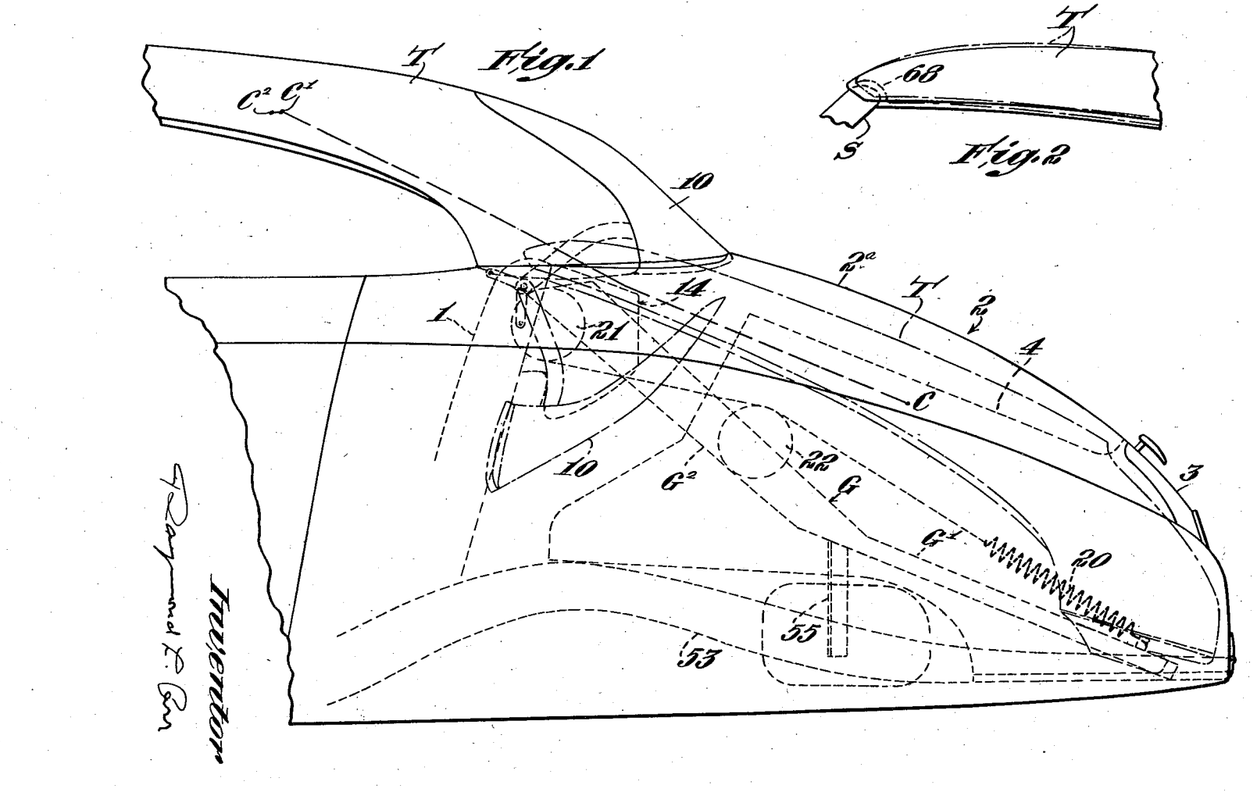
Fig. 1 is a side elevation of the rear of a vehicle body exemplifying the principles of the present invention, parts being shown in optional positions in dot and dash lines and certain parts being shown by dotted lines.
Fig. 2 is an elevational detail of the front portion of the top and the upper part of one of the windshield standards, showing in dot and dash lines the position of the front of the top as it approaches the standards.
Figure 3:
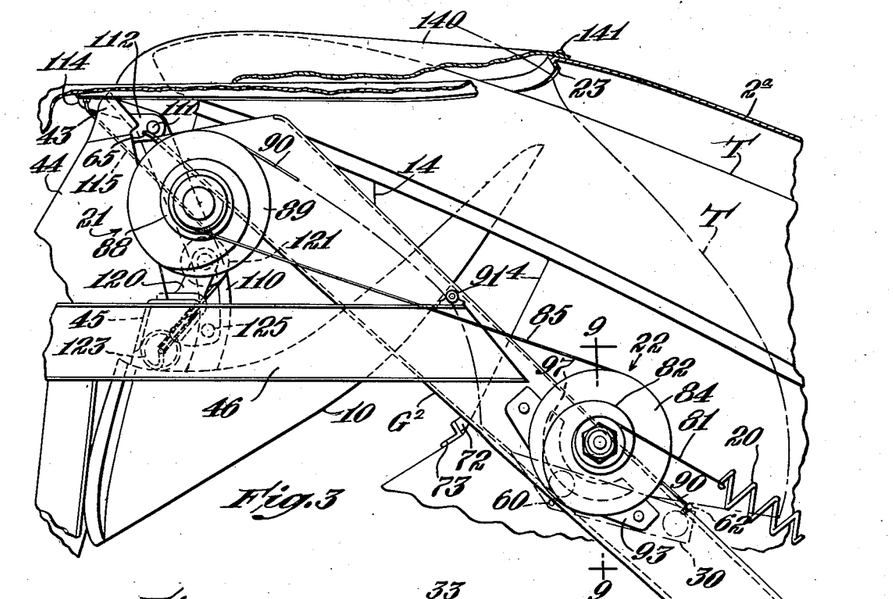
Fig. 3 is an elevational view of a portion of the assembly at the front of the rear deck, the outer wall of this deck and a portion of the cooperating apron being broken away, parts being shown in section and in dotted lines.

As shown in Fig. 1, the deck may be provided with a fixed wall $2^a$ extending from the rear door 3 to the movable shell T and panel 10 when the latter are in their raised positions. The deck provides a front opening and, as shown in Figs. 3 and 12, a depending flange 23 surrounds this opening, this flange being flared rearwardly at the rear of the opening and rearwardly and laterally at the sides thereof.

Figure 8:
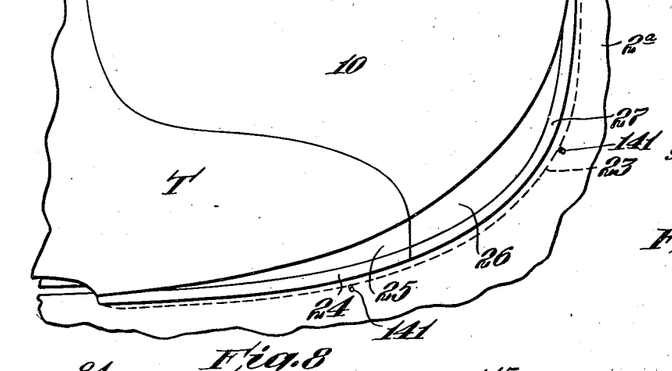
Fig. 8 is a plan view showing the rear corner of the raised top and the adjoining part of the deck.
Figures 12, 13, 14, 15, 16, 17, 18, 19:
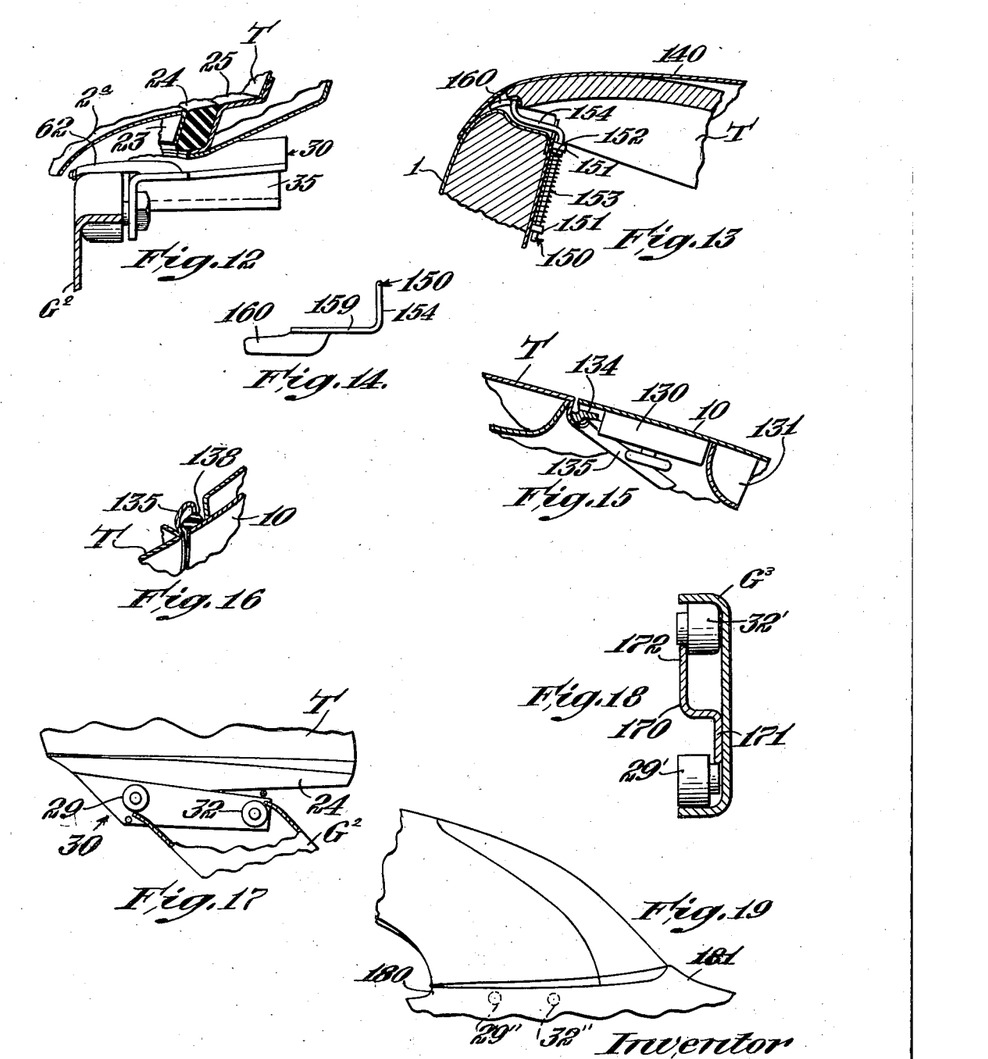
Fig. 12 is a vertical section through the front of the deck and a portion of the raised top.
Fig. 13 is a central longitudinal section through the upper part of the rear seat back and through the front of the lowered top, also showing adjoining parts.
Fig. 14 is a plan view of one of the parts shown in Fig. 13.
Fig. 15 is a central vertical section of the joint between the shell and the rear panel, showing the latching means for the latter.
Fig. 16 is a detail view, partly in section, of this same joint near the lower part of the panel.
Fig. 17 is a diagrammatic detail showing the upper part of a guide and the lower part of the top and illustrating the manner in which the top may be removed from the guide and thus separated from the body.
Fig. 18 is a vertical section through an optional guide and roller arrangement.
Fig. 19 is an elevational detail of an optional arrangement of the top and deck structure.

The shell T, as shown in Figs. 8 and 12, has rubber strips 24 at the outer margins of narrow laterally extending panel portions 25 so that upwardly tapered outer surfaces of the strips 24 may firmly engage the flange or skirt 23 at each side of the deck to afford a substantially weather-tight seal and so that, during final upward movement of the shell, they aid in accurately positioning the rear of the shell laterally of the vehicle. The upper surfaces of the panel sections 25 and rubber strips 24 preferably form substantial continuations of the adjoining surfaces of the deck so that, in so far as appearance is concerned, the parts 24 and 25 may be regarded as forming portions of the deck, although these parts actually are portions of the movable top structure.

Similarly the rear panel 10 may have laterally extending panel sections 26 (Fig. 8) which are disposed at the rear of the panel sections 25 when the top is raised. Each panel section 26 may support the end of a rubber strip 27 which is aligned with a strip 24 on the shell. It is evident that when the top is raised, the parts 26 and 27 also appear to form portions of the deck, although in fact these parts are portions of the panel 10. As shown in Fig. 8, the panel sections 26 need not extend to the rearmost part of the panel 10, but the rubber strip 27 preferably extends across the back of the panel to engage the corresponding portion of the flange or skirt 23.

Preferably the joint between the parts 24 and 25 on the shell and the corresponding parts 26 and 27 on the panel is arranged so that these members engage each other along an upwardly and rearwardly inclined plane, as indicated for example in Fig. 1.

The arrangement of the outstanding panel sections on the top is preferred, although not necessary, to the realization of the aims of the present invention. In other words, the opening in the front portion of the deck could be made smaller so that the latter would directly engage the upstanding wall portions of the top when the latter was in its raised position. However, such an arrangement would necessitate a relatively small clearance as the top was approaching its raised position and apparently would necessitate a rather peculiar shaping of the top, requiring a relatively "square" shape for the lower rear portion of the top which would generally be inconsistent with attractive appearance.

It is to be understood, moreover, that in certain cases the dimensions and shapes of various portions of the body as well as the positions of the housings for the rear wheels may render it desirable to afford a narrow rearwardly projecting extension on the rear panel 10 as well as lateral extensions thereon. Such an arrangement would permit the rear part of the skirt 23 to be spaced somewhat behind the upstanding portion of the raised top and would afford additional room for the top as it passed to its raised position.

At each side of the shell T, I may provide a supporting bracket, designated generally by the numeral 30 (Figs. 4 to 6), and arranged rotatably to support a front roll 29 and a rear roll 32, these rolls being spaced at a substantial distance from each other and their axes lying in a plane which has a moderate upward and forward inclination relative to the raised top. The body portion of each bracket 30 preferably is in the form of an angle 31 having a depending flange disposed in a vertical plane and having a flange at right angles thereto which is substantially parallel to the plane of the axes of the rolls. In other words, the upper flange of the angle 31 has a moderate upward and forward inclination.

The rolls 29 and 32 preferably may be similar to each other and may be mounted on studs secured to the vertically disposed flange of the angle 31.

Figure 6:
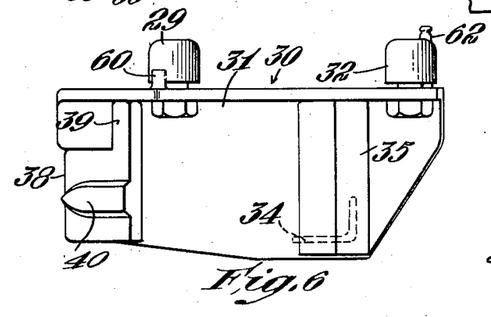
Fig. 6 is a bottom view of one of the supporting brackets for the top, showing the rolls on which the top moves from raised to lowered position.
Figure 7:
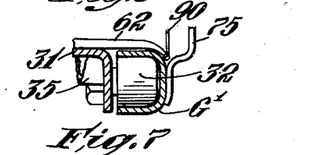
Fig. 7 is a section on line 7—7 of Fig. 5, but on an enlarged scale.

Suitable frame members within the side walls of the rear of the top preferably are secured to the upper flange of the angle 31. For example, as indicated in dotted lines in Fig. 5, a main frame member 33, such as a channel, and a diagonally disposed angle 34 may be secured, as by welding, to this flange. Preferably the angle 31 is reinforced by a smaller angle 35; the flanges of the latter may be secured, as by welding, to the lower face of the upper flange of the angle 31 and the end of angle 35 may be similarly secured to the depending flange of the larger angle (Figs. 6 and 7).

At the front of each bracket 30, I provide a positioning plate 38 which is inclined upwardly and forwardly at a relatively steep angle to the upper flange of the angle 31. Preferably the latter is provided with a rabbeted inner front corner in which the intermediate part of the corresponding positioning plate 38 fits, the lower part of this plate having an extension 39 which fits against the lower face of the upper flange of angle 31 and which extends laterally from the rabbeted portion of this flange into engagement with the depending flange. Obviously the plate 38 may be secured to the angle by welding, and it is evident that the angle 35 and the portion 39 of plate 38 co-operate in affording stiff reinforcements for the angle 31 to maintain the flanges or legs thereof at right angles to each other. The upper part of the plate 38 may be secured to the lower part of the framing of the top, for example, the lower part of the member 33. The lower surface of the plate 38 is generally planar but is provided with a longitudinal protuberance 40 having edge surfaces which incline downwardly and inwardly toward each other and having a front or nose portion wherein these edge surfaces incline toward each other.

Figures 9, 11:
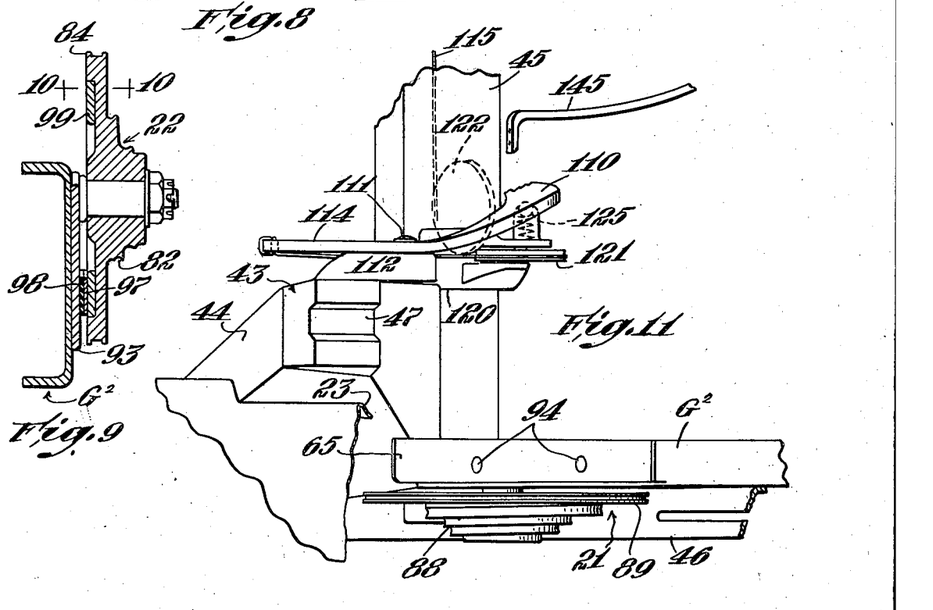
Fig. 9 is a section on line 9—9 of Fig. 3, showing a portion of the assist mechanism.
Fig. 11 is a plan view of a portion of the structure at one side of the front of the deck, showing a part of a guide, a part of the assist mechanism, and adjoining parts.

Each positioning plate engages a complementary positioning block 43 (Fig. 11) on the vehicle body as the top moves to its raised position. Each block 43 may be conveniently mounted on a supporting bracket 44 which has the general form of a pyramid and which is secured to a transverse frame member 45 and to a longitudinal channel 46. As shown in Fig. 11, the positioning block 43 may be provided with a longitudinal recess 47, the sides of which incline downwardly and inwardly toward each other so that the parallel portions of the sides of a protuberance 40 may closely fit in this recess when the top is in raised position and so that the pointed nose portion of protuberance 40 is readily guided into the recess as the top nears its raised position. Thus accurate lateral positioning of the rear of the raised top is effectively assured.

The guides G preferably comprise lower channel portions G¹ provided with inwardly extending parallel flanges and upper channel portions G² joined to the channels G¹ but provided with flanges which diverge upwardly and forwardly. As shown, the flanges of the channel portion G² are spaced at a greater distance than the corresponding flanges of the channel portion G¹ and incline upwardly at substantially steeper angles.

Figure 5:
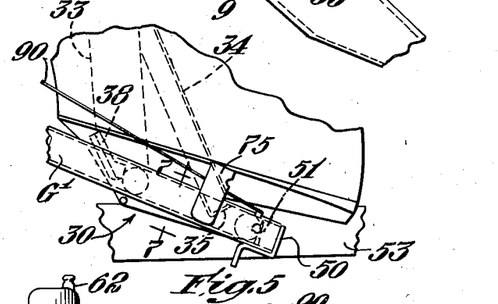
Fig. 5 is a similar view, but showing the lower part of a guide for the top and also showing adjoining parts.

Fig. 5 illustrates in detail the lower part G¹ of a guide G. This portion of the guide may be supported on a Z-shaped member 50 which extends from the side rail 53 of the chassis frame and closes the lower end of the channel. A suitable rubber block 51 (shown in dotted lines in Fig. 5) may fit within the closed lower end of the channel to provide a stop for the corresponding rear roll 32. The flanges of the channel section G¹ are preferably only spaced from each other at a distance substantially equal to the diameter of each roll on the top so that the shell is constrained thereby to follow a substantially straight line path. Thus, as shown in Fig. 1, the lower part of the path of the center of gravity of the top is inclined upwardly and forwardly in a straight line.

A suitable diagonally disposed brace, such as an angle member 55 (Fig. 1), may extend upwardly from the side rail 53 of the chassis frame and may brace and support the intermediate part of the channel G. The channel section G² must be positioned so that a suitable clearance is provided for the wheel housing or rear mudguard of the vehicle and yet so that the upper rear portion of the shell may clear the rear of the flange or skirt 23. Fig. 3 shows in dot and dash lines the position of the rear of the top in its region of minimum clearance.

Since the flanges of the channel section G² are spaced from each other, the person lifting the top might tend to swing the latter through a substantial angle, for example, when the rear of the top was in the position indicated in dot and dash lines in Fig. 3. This would be undesirable since it might result in engagement of the moving top with the rear deck.

In order accurately to position the shell during this portion of its path, I have therefore provided suitable positioning elements on the brackets 30 in addition to the rolls 29 and 32. Thus, below each roll 29 and somewhat forwardly of the axis thereof, I provide a relatively short protuberance 60 secured, as by welding, to the depending flange of the bracket 30. This protuberance is positioned so that it may engage the inner margin of the lower flange of the channel section G², if there is any substantial tendency to move the roll 29 out of engagement therewith.

Similarly at the rear of each bracket I have provided a positioning element or guiding finger 62 which is closely juxtaposed to the upper flange of the channel section G². When for example, the shell is in the position indicated in dot and dash lines in Fig. 3, this finger 62 is effective in preventing any substantial movement of the rear roll 32 away from the upper flange.

Preferably, as shown in Fig. 3, the flanges at the lower parts of the guide sections G² should be slightly thicker than these same flanges at the upper part of these sections in order properly to cooperate with the auxiliary members 60 and 62 and yet to permit the proper movement of the top at the upper part of its path.

Since the auxiliary positioning elements 60 and 62 are not provided with anti-friction means, their sliding movement on the corresponding flanges will result in increased frictional resistance to the upward movement of the top and will have the psychological effect of tending to cause the person lifting the top to permit the same to swing to a position wherein the positioning members are spaced from the flanges and wherein both rolls are engaging the flanges.

The upper end of each guide section G² is provided with a lower or front flange having a projection 65 extending upwardly and forwardly for a short distance beyond the rest of the channel. This projection has an inclination which is not quite as steep as that of the remainder of the flange.

Figure 4:
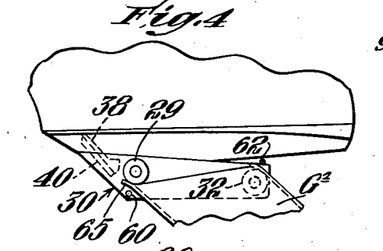
Fig. 4 is an elevational detail of the upper part of a guide for the top, showing the adjoining part of the top when the latter is in its normal raised position.

The inner surface of the other flange of this channel section is straight for the entire length thereof which is engaged by the rear roll 32 during the normal movement of the latter, but the upper extremity of this flange may be turned inwardly to overhang the roll 32 when the top is in its raised position, there being a small clearance between this roll and the overhanging portion of the flange. Fig. 4 illustrates the positions of the rolls relative to the upper part of the guide when the top is raised. The overhanging portion of the upper or rear flange of the guide channel provides means positively to prevent the upward movement of the top to any substantial extent when the front portion of the latter is secured to the windshield standards, it being evident that the rubber elements 24 are normally effective for this purpose, but that the inturned end of the flange provides a positive stop for this purpose should the rubber be compressed abnormally due to a substantial upward force on the top.

The arrangement of the flange projection 65 cooperates with the rolls and the rear flange in causing the front of the top to move over the windshield standards in the manner diagrammatically illustrated in Fig. 2, wherein the position of the top shown in dot and dash lines is that wherein its center of gravity is at the point C¹ of Fig. 1. During the final movement of the shell, its center of gravity moves from the point C¹ to the point C², or along a nearly horizontal path which may have a slight downward and forward inclination. Thus the point C¹ may be the highest point of the path of the center of gravity of the shell. During its final movement, the shell may be regarded substantially as swinging about a forwardly moving axis which is near its center of gravity, this swinging movement resulting in the final upward movement of the rear of the shell and the final downward movement of the front of the same after the latter has passed over the highest parts of the windshield standards. Each standard S may have a portion which normally fits within a socket 68 at the front of the shell.

It is evident that this arrangement avoids necessity for any substantial dragging of the front of the top over the windshield standards and that the guiding means is so positioned that it is not necessary manually to lift and support the weight of the front of the top as the same is being moved out of engagement with the windshield standards. In other words, the front of the top practically swings into interfitting engagement with the upper parts of the windshield standards, although, if desired, in the last small fraction of the forward movement of the top it may be supported by rolls 29 and by the standards, the rolls 32 being very slightly spaced from the corresponding flanges. In any case, an arrangement of this character avoids necessity for manually lifting or supporting the nose of the top as it either approaches or leaves the standards. The slight upward movement of the center of gravity of the top as it moves from point C² to point C¹ is aided by the compressed rubber strips 24.

Preferably the rear portions of the channels 46 are secured as by welding to the outer faces of the guide channel sections G². Depending from the latter there may be blocks 72 which are secured to a transverse angle 73 (Fig. 3). The blocks 72 of course are so positioned that the short protuberances 60 on the brackets 30 may move past the same. It may be noted that the arrangement of rolls 29 and 32 and of elements 60 and 62 permits the outer surface of the guide G and the major portion of its bottom surface to be available for connection with frame elements, brackets and the like. Thus, for example, the guides may be employed to support or brace the deck framing, if desired.

As previously indicated, the center of gravity of the top follows a straight-line, inclined path during the lower part of its movement, this path being parallel to the channel sections $G^1$. When the rolls 29 and 32 engage the diverging flanges of the channel sections $G^2$, the center of gravity of the top follows a path which is inclined upwardly at a slight angle to the straight-line lower portion thereof. The inclination of this path, however, decreases slightly as the upward movement is continued so that the upper part of the path of the top is in the form of a very gradual curve.

As will be evident from the foregoing and from an inspection of Fig. 1, the path of the center of gravity of the top between the points C and $C^2$ does not deviate greatly from a straight line extending between these points. For example, as shown, the maximum deviation is less than five per cent of the length of this path. It furthermore may be noted that between points C and $C^1$ there is no abrupt angular change in the direction of movement of the center of gravity of the top. I do contemplate, however, that abutment elements such as disclosed in my co-pending application Serial No. 306,794, filed on even date herewith, may be provided, which might result in deviations of the path of the center of gravity for short distances, but, in any case, I deem it desirable that there should not be any deviation of more than 5° from the angle of the straight line between the points C and $C^2$ which would be longer than the distance between the axes of the front and rear rolls 29 and 32.

The arrangement of the guiding means so that the path of the center of gravity of the top is nearly a straight-line path is distinctly advantageous when the top is to be manually lifted and, if an assist mechanism is provided, in permitting a rather uniform pull to be exerted by the person lifting the top in addition to the pull exerted by the assist mechanism. Furthermore, such an arrangement is also desirable even if a mechanical lifter is provided, permitting the same to operate effectively without necessity for excess capacity.

To facilitate lifting of the shell, I prefer to provide mechanism for urging the shell toward its raised position. While actuating means of the power-operated type may be employed, I prefer a manually movable shell provided with assist mechanism, including movable weights or springs.

The assist mechanism disclosed herein may operate in accordance with the same general principles as are disclosed in my first above-identified application. In general, for example, this mechanism comprises spring means effective through parts providing varying leverage. In accordance with the present invention, similar assist mechanisms may in fact be provided at each side of the deck. For this purpose brackets 75 (Figs. 5 and 7) may be secured on the outer faces of the lower channel sections $G^1$ at each side of the deck, these brackets having portions offset laterally from the channels, which are connected to the lower ends of the springs 20.

While for purposes of convenience in illustration, I have shown but a single spring 20, it may often prove desirable from the point of view of compactness to provide two or three springs, one nested concentrically within the other. The upper end of each spring 20 is connected to a cable 81 (Fig. 3) which is wrapped about a spiral or conical pulley 82 forming part of the pulley assembly 22, previously referred to. This spiral pulley increases rapidly in diameter and is arranged so that the spring 20, when fully tensed, exerts a minimum leverage and so that when the spring is stretched to the minimum extent the cable may extend from a portion of the conical pulley element 82 which has a radius substantially equal to the maximum radius of the pulley assembly 22. The latter also includes a pulley section 84 of uniform diameter (see Fig. 9). A cable 85 wrapped around this pulley section extends to a conical pulley section 88 of the pulley assembly 21. The pulley section 88 has a more gradually increasing radius than does the first conical pulley section but also is arranged so that when the spring is stretched to the minimum extent, the cable 85 is engaging a portion of the pulley which has a radius substantially equal to the maximum radius of the pulley assembly 21. The latter also includes a pulley section 89 of uniform diameter about which a cable 90 may be wound, the looped extremity of this cable (Figs. 5 and 7) being secured to the outer portion of the finger 62.

When the top is raised, the spring 20 is stretched to the minimum extent and the cables 81 and 85 are engaging the portions of the conical pulley sections which have the maximum radii. When the top is in its lowermost position, however, the spring 20 is stretched to its maximum extent and the cables extend from the portions of the conical sections which have the minimum radii. This arrangement of two conical pulleys acting in series permits a wide variation in the leverage between the spring and the top. Thus, for example, in the illustrated arrangement, when the spring is fully stretched, this leverage may be of the order of 1:8 while, when the top is near the upper end of its path, this leverage may be of the order of 1:1. An arrangement of this character, coupled with the arrangement of the guiding means so that the center of gravity of the top follows a path which does not deviate greatly from a straight line, permits a substantially uniform tendency to balance the effective weight of the top so that only a relatively light manual pull is necessary to lift the same.

It will of course be evident that the pulley assemblies 21 and 22 are mounted on any suitable brackets which may be supported on the guides G. Thus, for example, the bracket 93 for the pulley assembly 22 is secured to the outer face of the channel section $G^1$ while the corresponding bracket for the assembly 21 may be secured to the lower flange of this section by countersunk fastenings 94 (Fig. 11).

In the illustrated embodiment, the upper flanges of members 46 may be slotted (as shown at the right of Fig. 11) to accommodate the cables 85, while rolls 91 may be disposed at the ends of these members to engage cables 90 as the shell is moving towards its raised position.

Figure 10:
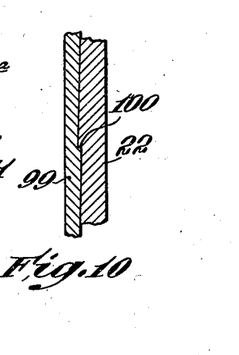
Fig. 10 is a sectional detail on the line 10—10 of Fig. 9.

In order to prevent too rapid downward movement of the top under the action of gravity, I preferably provide a one-way brake mechanism associated with each pulley assembly 22. Thus, for example, severe shocks are avoided when the top reaches its lowermost position. Figs. 3, 9 and 10 particularly illustrate this brake mechanism.

The bracket 93 may support a segmental strip of material 97 having a high coefficient of friction backed by a strip of yieldable, compressible material 98 such as rubber. A thin ring 99 fits within an annular recess in the pulley assembly and has a flat outer face engaging the strip 97. Mutually engaging, lateral faces of the ring and pulley are provided with radially disposed, circumferentially spaced abutment surfaces 100, one of which is shown in Fig. 10. These surfaces preferably are very narrow, and between these abutment surfaces the ring and the pulley have relatively long segmental surfaces, each having a very slight inclination relative to the plane of rotation of the pulley. In other words, the abutment surfaces are spaced at substantial distances circumferentially.

When the pulley assembly 22 is moving in a clockwise direction, as viewed in Fig. 3, i. e., the top is being lifted, the gradually inclined surfaces of the pulley and of the ring 99 move relative to each other, such movement resulting in compression of the strip 98 until protuberant portions of the ring pass over the protuberant portions of the pulley, when the parts will be in the position shown in Fig. 10. This gradual compression only takes place over a substantial distance in the path of the top due to the substantial circumferential spacing of the abutment surfaces 100 and due to the leverage between the pulley 21 and the pulley 22. Accordingly but little extra effort is required to compress the material 98 to the extent necessary to permit movement in this manner. It will be understood that under these conditions the ring 99, being pressed in frictional engagement with the material 97, is held against rotation by this material, the mutually engaging surfaces of the ring and pulley having a substantially lower coefficient of friction than the mutually engaging surfaces of the ring and the strip 97.

When the pulley is moving in the opposite direction, i. e., when the top is moving downwardly, the abutment surfaces 100 engage at a plurality of points about the circumference of the ring, causing the ring to turn with the pulley, this action being retarded by the friction strip 97 which is being yieldably pressed against the ring by the material 98. Accordingly this arrangement provides a simple one-way brake arrangement with only one moving part, i. e., the ring 99, and without necessity for springs, ratchets, or the like.

The general arrangement shown herein is also adapted to the employment of assist mechanism including movable weights. The latter may move in paths beside and roughly parallel to the rear seat back. In such a case, the cables connected to the top preferably are disposed inwardly of guides G and fingers 62 may then be made relatively short. Obviously with such an arrangement or with a spring-operated mechanism of the type shown, the one-way brakes may be associated with the pulley assemblies at the upper ends of guides G.

The rear panel 10 preferably is fixed to curved arms 110 which are pivotally mounted on pins 111 carried by lugs 112 projecting rearwardly from the positioning blocks 43. The arms 110 may have extensions 114, the extremities of which have openings to receive the ends of cables 115 associated with counterbalancing mechanism for the panel 10. As the panel 10 moves toward its lowered position, the outer and rear surface of the rubber strip 27 moves out of engagement with the flange 23, the shape of the joint between the panel and the shell T being such that the swinging movement of the panel is permitted. For this purpose the joint, as viewed in side elevation (Fig. 1), preferably has each of its portions disposed at an angle to a tangent of a circle drawn about the axis of rotation as a center, which circle intersects the corresponding portion of the joint. It will thus be noted that the lower part of the joint between the top and the panel is nearly vertical. As the panel swings downwardly, its upper edge suitably clears the skirt 23.

In its lowered position the lower part of the panel is juxtaposed to the back of the rear seat and the upper edge of the panel is spaced sufficiently below the path of the top to permit movement of the latter to lowered position. One factor which must be considered in the movement of this panel is the width of the lowered panel adjoining the wheel housings, the position of the axis of rotation, and the dimensions being so determined that the panel may swing either above or between the wheel housings.

The counterbalancing means for this panel may include similar brackets 120 which are mounted on the cross-member 45 and which carry pulleys 121 disposed above the latter and having vertical planes of rotation. These brackets also carry pulleys 122 disposed below the upper flange of the angle 45 and set at angles, i. e., in a plane inclined upwardly and rearwardly as viewed from the side. The cable 115 at each side of the top extends over a pulley 121 and around the pulley 122 and is connected to a tension spring 123 (Fig. 3) extending transversely of the vehicle directly behind the rear seat. Either a separate spring 123 may be provided for each side of the panel or the pulleys may extend inwardly to a single, centrally disposed spring. The counterbalancing mechanism disclosed herein is effective in affording its maximum counterbalancing effect when the center of gravity of the panel 10 is positioned substantially in the same horizontal plane as the axis of rotation, the effective leverage of the spring decreasing substantially as the panel moves to its lowered position.

A detent 125, for example of the spring-pressed, ball type, may be engageable with a recess in the arm 110 to prevent accidental rearward swinging of the lowered panel 10, when, for example, the vehicle brakes are applied.

Preferably a single snap fastening or latch may be effective in holding the panel 10 in its raised position. Such a latch 130 is shown in Fig. 15. A suitable finger hold 131 may be disposed behind this latch. The shell T may be provided with a gutter-like portion 135 extending around the edge of the opening for the panel 10, and at the lateral center of this gutter portion it may be partially cut away and a steel striker piece 134 may be welded thereto for engagement with the bolt of the latch 130. Preferably the upper surface of the striker 134 may be slightly grooved, as shown, to permit drainage from this portion of the joint into the gutter 135. The edge of the panel 10 may be provided with rubber strips 138 which are pressed against the gutter 135 when the top is raised and the panel 10 in normal position. Near the lower part of the panel the gutter may be bent inwardly, as shown in Fig. 16, so that the rubber strip 138 only engages the outer wall of the same, the inner flange thereof being positioned so that as the panel 10 swings downwardly, the strip 138 may readily pass this flange. This arrangement is desirable since the relative movement between the shell and the panel at the lower part of the joint is nearly a sliding movement, while at the upper part of this joint, i. e., in the region of the latch, the movement is similar to that of a door swinging against a door jamb.

One important feature of the present invention involves the arrangement of the panel 10 so that it may be moved from its lowered to its raised position (or vice versa) while shell T remains in its normal position. Thus the present arrangement facilitates lowering of panel 10, when the shell T is being kept in its raised position, thereby, for example, affording ample ventilation with shade in extremely hot weather.

Preferably a flexible apron 140 of leather or the like may be secured to the cushion on the back of the rear seat and may be provided with suitable eyelets forming parts of snap fastenings, the other parts 141 of which are fixed on the deck about the opening. Thus when the top is lowered, the apron 140 may extend over the front of the lowered top and may cover the opening, as shown. If desired, suitable fastening elements may be provided on the inside of the top so that when the latter is raised, the eyelets on the apron may be engaged therewith so that the apron may be fastened in place when the top is raised.

Since the position of the lowered panel 10 results in some curtailment of the capacity of the storage compartment 4 and since there is substantial room between the path of this panel and the seat back, I preferably provide the basket 14 which may be accessible from the passenger compartment when the top is raised. This basket may conveniently be formed of any suitable material, such for example as fabric or wire mesh, secured to a metal strip 145 which is fastened to the seat back.

When the top is lowered and the apron 140 is fastened in place, the apron effectively prevents forward movement of the top, for example, should the vehicle be suddenly decelerated. However, some users of the vehicle might not fasten the apron in position, and I therefore consider it desirable to provide a suitable latch or snap fastening positively to retain the top in its lowered position and to prevent forward movement thereof. As shown for example in Fig. 13, the top may extend over the upper part of the rear seat cushion, thus, for example, being able to move past and over the rear seat without necessity for a swinging movement to lift the front of the top over the seat back.

The snap fastening referred to preferably may be secured to the central part of the seat back and may be in the form of a bar 150 having a straight portion slidably mounted in guides 151 fixed to the seat back and carrying a collar 152 which is urged upwardly by a compression spring 153. The upper part of the bar may have a forwardly extending portion 154 which extends through a notch in the panel of the seat back and which fits within a recessed portion of the upper part of the cushion. The bar then curves upwardly and has a straight horizontal continuation 159 which is normally pressed into engagement with a rubber lined rabbet or recess on the lowered top, this recess engaging the edge of the windshield panel when the top is raised. The end of the bar portion 159 carries a flat finger piece 160 accessible in front of the lowered top when the apron 140 is swung downwardly over the back of the seat. Thus when it is desired to raise the top, the finger piece 160 need only be pressed downwardly slightly so that the bar portion 159 moves out of the rabbet. The part 160 preferably is so positioned that it is engaged by the top with a snap action to depress the bar portion 159 as the top moves to its lowered position, thus permitting the latch automatically to snap into operative position when the top is lowered.

Although the arrangement of the guiding means G normally precludes any substantial upward movement of the top when the front of the same is secured to the windshield standards, Fig. 17 diagrammatically shows how the bracket 30 may be separated from the upper part of the channel if, for example, it is desired to remove the top for repair or any purpose. During this movement the front of the top is swung upwardly and substantial compression of the strips 24 is of course necessary, but is feasible due to the compressibility of the rubber and the width of these strips.

Fig. 18 illustrates an optional arrangement for retaining the rolls on the top in engagement with the corresponding flanges of a guide channel $G^3$, similar to channel $G^2$. Such a channel may be provided with a member 170 of generally Z-shaped cross section having one flange 171 juxtaposed and secured to the bight portion of the channel and having an opposite flange 172 spaced therefrom. The ends of rolls 29' and 32' on the top may be cut away to fit these flanges, the opposite end of each roll being shaped, however, so that the roll could not follow the path of the other roll of the pair.

Fig. 19 illustrates an optional arrangement which might be employed if sufficient room were not afforded between the wheel housing and the deck for guiding means positioned as shown in Fig. 3. Under such conditions it might be necessary to arrange the rolls 29'' and 32'' nearer the upper rear corner of the shell, and guiding means similar to that previously described might be employed but arranged higher, i. e., closer to the outer wall of the deck. Under these conditions, the upper wall of the deck would have upwardly projecting side and rear extensions 180 and 181 merging into each other so that the top would not have to be as high.

Figure 20:
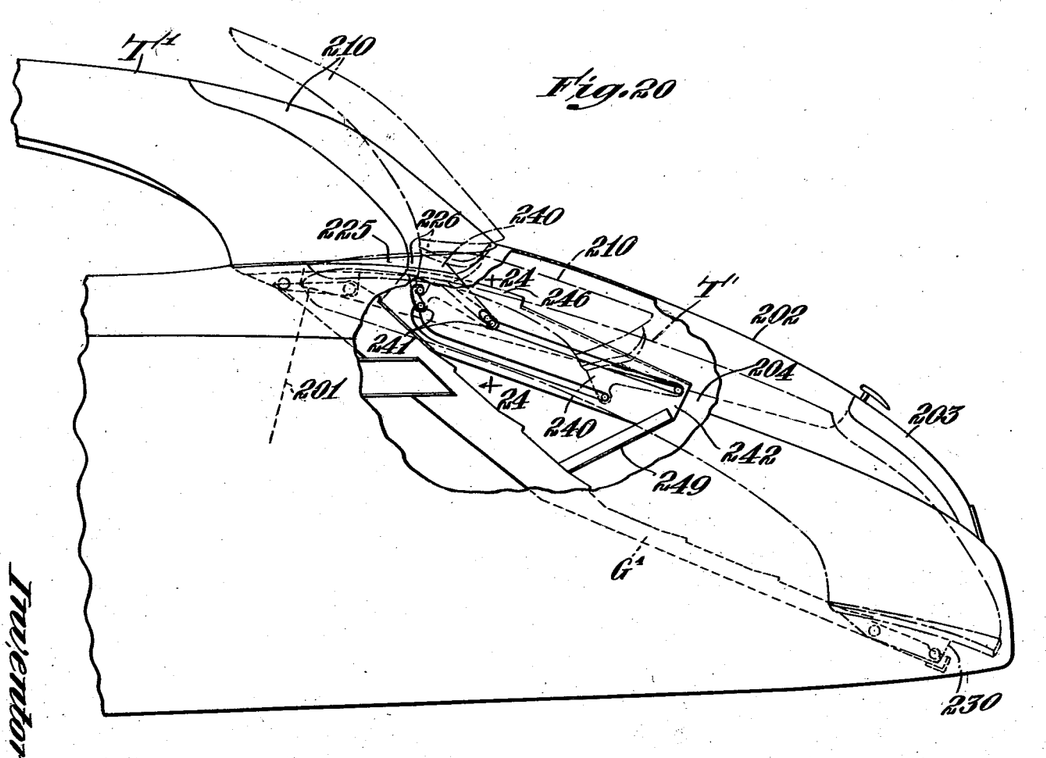
Fig. 20 is a side elevation of the rear part of a vehicle body provided with optional guiding structure for the rear panel and the shell, parts being broken away and shown in section.
Figure 21:
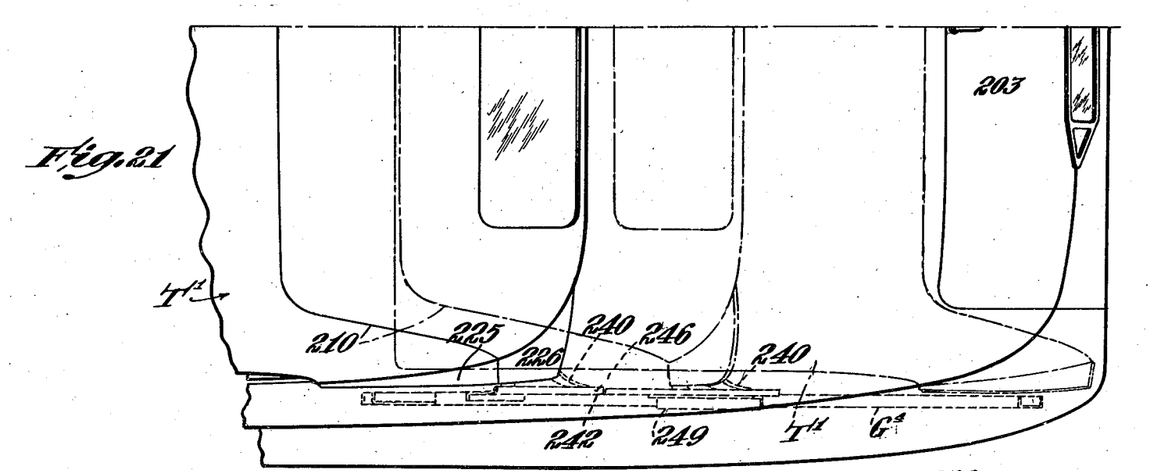
Fig. 21 is a plan view of a rear portion of the body shown in Fig. 20, parts being shown in optional positions by dot and dash lines, and parts being shown by dotted lines.

Fig. 20 shows an optional body arrangement wherein many of the parts correspond to those previously described. Thus, for example, the body may be provided with a top having a shell portion $T^1$ movable into a lowered position in a rear deck 202 which is provided with a rear door 203 to afford access to a storage compartment 204. In this embodiment of the invention the storage compartment may extend clear to the back of the rear seat 201. The top may be provided with brackets 230 similar to the brackets 30 previously described, and these brackets may be guided in guides $G^4$, generally similar to the guides G. The shell $T^1$ may have projecting panel sections 225 corresponding to the panel sections 25 of Fig. 8. The shell may also be provided with a rear opening which normally receives a rear panel 210. The latter may also be provided with lateral extensions 226 corresponding to the extensions 26 of Fig. 8.

Figure 24:
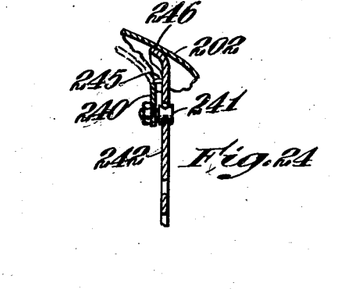
Fig. 24 is a section on line 24—24 of Fig. 20, but on a larger scale.

In this embodiment of the invention the chief feature of novelty is the arrangement of the guiding means for the panel 210 so that the latter moves into a lowered position over the lowered shell $T^1$. For this purpose I may provide a bracket 240 at each side of the panel, which carries a pair of rolls 241 engageable in guide slots in a guide plate 242. As shown, each guide plate may have a front portion mounted on the upper part of a guide $G^4$ and may have an upper flange 246 welded or otherwise secured to the fixed deck panel (Fig. 24). Behind this flange the upper edge of the plate 242 may be provided with a reinforcing flange 245 and the rear of the plate may be connected to a diagonally disposed strut member 249 extending upwardly from guide G⁴.

As shown in Fig. 20, the upper guide slot may have a straight upwardly inclined portion with a more steeply inclined forward end while the lower slot may have a straight portion connected to an upwardly curved portion which in turn is connected to an offset section extending upwardly to a second offset portion. The illustrated arrangement is such that the panel 210 may be rolled from its lowered position, shown in dot and dash lines, to the temporary elevated position, also shown in dot and dash lines, wherein the front roll at each side of the panel is retained in the upper offset portion of each of the longer and lower slots.

When the panel is in this temporary position, the shell T¹ may be rolled upwardly; the panel then may be lifted slightly so that each front roll may swing downwardly through the upper part of the lower slot to the position shown in full lines in Fig. 20, whereupon the panel may be fastened in place in any suitable manner. When the top is to be lowered, the panel is swung upwardly to its elevated position, shown in dot and dash lines, whereupon the shell may be lowered and the panel may then be moved to its lowered position. It is evident that in this position the panel 210 straddles the upper portion of the mid and forward parts of the shell, and it furthermore may be noted that the lateral extensions 226 of the panel need to be relatively wide to afford adequate clearance for the rear portions of the brackets 249 when the panel is in its elevated position, it of course being necessary that these brackets be shaped so that they can straddle the lowered shell.

Figure 22:
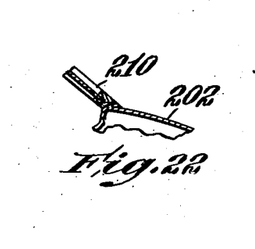
Fig. 22 is a central vertical section through the rear of the top and the front of the deck.
Figure 23:
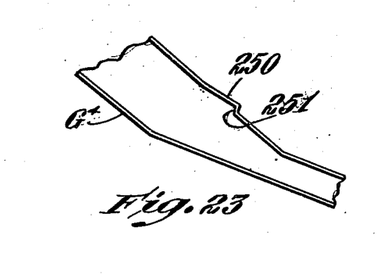
Fig. 23 is an elevational detail of a portion of the guiding means shown in Fig. 20.

As shown in Fig. 22, the rear part of the panel in its normal raised position actually fits over the front of the deck 2; in other words, the rear corner of the panel moves downwardly and forwardly as the panel moves from its elevated to its normal operative position.

The guides G⁴, as illustrated herein, are provided with upper flanges having offset portions 250 with gradually inclined inner surfaces extending at a more moderate angle than the body portion of the flange and with steeply inclined abutment surfaces 251. Thus when the top is released upon its downward path, the rear guide roll upon each side may engage an abutment surface 251 to interrupt or impede further movement of the top. It may also be noted that the lower part of the upper flange of the channel is cut away to permit the rear roll to swing upwardly so that the front of the top may swing into a rabbet at the upper part of the seat back.

I claim:

1. In a vehicle body, the combination comprising a passenger compartment, a windshield, a rear deck behind said compartment having a downwardly and rearwardly inclined outer wall, a shell movable from a raised position where it extends over the major portion of said compartment behind said windshield to a lowered position below said wall, and supporting and guiding structure for said shell, said deck having a fixed wall portion extending forwardly to edge portions which have direct engagement with the raised shell, the deck having an opening bordered by said edge portions, through which opening the shell passes from raised to lowered position, the guiding and supporting structure being constructed so that the center of gravity of the shell is constructed to follow a path which does not deviate more than 5% of its length from a straight line extending between the center of gravity of the lowered shell and the center of gravity of the raised shell.

2. In a vehicle body, the combination comprising a passenger compartment, a windshield, a rear deck behind said compartment having a downwardly and rearwardly inclined outer wall, a shell movable from a raised position where it extends over the major portion of said compartment behind said windshield to a lowered position below said wall, supporting and guiding structure for said shell, said structure being constructed so that the path of the center of gravity of the shell does not deviate more than 5% of the length of said path from a straight line extending between the position of the center of gravity of the lowered shell and the position of the center of gravity of the raised shell.

3. In a vehicle body, the combination comprising a passenger compartment, a windshield, a rear deck behind said compartment having a downwardly and rearwardly inclined outer wall, a shell movable from a raised position where it extends over the major portion of said compartment behind said windshield to a lowered position below said wall, supporting structure for said shell, said supporting structure including upwardly and forwardly inclined guides at the sides of the deck, a pair of rolls rotatably mounted on each side of the shell and spaced longitudinally of the corresponding guide, the supporting structure being constructed so that during the movement from raised to lowered position of the shell its center of gravity is constrained to follow a path not deviating from the inclination of a straight line between the position of the center of gravity of the lowered shell and the center of gravity of the raised shell at an angle of more than 5° for a distance as great as the longitudinal distance between the axes of the respective rolls at one side of the shell.

4. In a vehicle body, the combination comprising a passenger compartment, a rear deck behind said compartment, a shell movable from a raised position where it extends over the major portion of said compartment behind said windshield to a lowered position within said deck, supporting and guiding structure for said shell, and a one-way brake inoperative as the shell is being moved to raised position but being operative to retard the downward movement of the shell under the action of gravity.

5. In a vehicle body, the combination comprising a passenger compartment, a windshield, a rear deck behind said compartment having a downwardly and rearwardly inclined outer wall, a top movable from a raised position where it extends over the major portion of said compartment behind said windshield to a lowered position below said wall, and supporting and guiding structure for said top, said deck having a fixed wall portion extending forwardly to edge portions which have direct engagement with the raised top, the deck having an opening bordered by said edge portions, through which opening the top passes from raised to lowered position, said top having a rear opening, a panel for closing said opening separable from the top and independently movable to lowered position, supporting means for said panel constructed and arranged so that the panel is mounted for swinging movement between its raised and lowered position and is movable upwardly between the rear of the raised body portion of the top and the fixed deck wall when the top is in its raised position.

6. In a vehicle body, the combination comprising a passenger compartment, a windshield, a rear deck behind said compartment having a downwardly and rearwardly inclined outer wall, a top movable from a raised position where it extends over the major portion of said compartment behind said windshield to a lowered position below said wall, supporting and guiding structure for said top, said deck having a fixed wall portion extending forwardly to edge portions which have direct engagement with the raised top, the deck having an opening bordered by said edge portions, through which opening the top passes from raised to lowered position, said top having a rear opening therein, a panel for closing said opening, said panel being separable from the top, and guiding means for said panel arranged to guide the panel over the lowered top in straddling relation thereto.

7. In a vehicle body, the combination comprising a passenger compartment, a windshield, a rear deck behind said compartment, a shell movable from a raised position where it extends over the major portion of said compartment behind said windshield to a lowered position within said deck, the front of the shell when raised extending over the windshield, supporting and guiding structure for said shell, said passenger compartment having a seat therein with the back of the seat extending upwardly at the front of said deck, said structure being arranged so that the front of the lowered shell directly overlaps the upper part of the back of said seat in such a way that the shell may be moved out of its lowered position without necessity for swinging the front of the shell upwardly to clear the seat back.

8. In a vehicle body, the combination comprising a passenger compartment, a windshield, a rear deck behind said compartment having a downwardly and rearwardly inclined outer wall, a shell movable from a raised position where it extends over the major portion of said compartment behind said windshield to a lowered position below said wall, supporting and guiding structure for said shell, said structure including upwardly and forwardly inclined guide channels at each side of the deck, and a pair of rolls at each side of the shell movable in said channels and engageable with inner surfaces of the flanges of said channels and parts on the shell engageable with the outer surfaces of flanges of the channels.

9. In a vehicle body, the combination comprising a passenger compartment, a rear deck behind said compartment and having a fixed outer wall, a rigid top movable from a raised position over said compartment to a lowered position within said deck, said top having a rear portion with upstanding side walls and with panel sections projecting laterally from the lower parts of said side walls, guiding and supporting structure for said top, said top when lowered being inclined upwardly and forwardly relative to its raised position, said wall of the deck providing an opening through which the top may pass from lowered to raised position, edge portions of the deck wall which border said opening being directly engaged by the panel sections when the top is raised, said side walls of the top being arranged so that the upstanding rear portion of the top decreases in width toward the back, said panel sections decreasing in width toward the front.

10. In a vehicle body, the combination comprising a passenger compartment, a rear deck behind said compartment and having a fixed outer wall, a rigid top shell movable from a lowered position within said deck to a raised position over said compartment, said shell in its lowered position being inclined upwardly and forwardly relative to its raised position, supporting and guiding structure for said shell, said wall of the deck providing an opening through which the shell passes from lowered to raised position, edge portions of the wall bordering said opening being directly engaged by the rear of the raised shell, said shell providing a rear opening, a rearwardly bulged panel normally closing said opening when the shell is raised, said panel then engaging edge portions of the deck wall which border the rear part of the opening therein, said panel being movable from its normal position before the shell is lowered so that the rear part of the deck opening behind the raised shell affords additional room for movement of the shell toward its lowered position, but whereby the raised shell and the panel cooperate in enclosing the deck opening.

11. In a vehicle body, the combination according to claim 10 also arranged so that the rear of the shell and the panel are each provided with laterally extending panel sections which engage edge portions of the deck wall bordering the opening therein.

12. In a vehicle body, the combination comprising a passenger compartment, a windshield, a rear deck behind said compartment, a rigid top movable from a raised position over said compartment to a lowered position within said deck, said top when lowered being upwardly and forwardly inclined, supporting and guiding structure for said top, said top having a body portion with a rear opening therein, a panel separable from said body portion and lowerable into the deck, and supporting means upon which the panel is mounted for movement independently of the body portion of the top, the supporting and guiding structure and said supporting means being constructed so that the panel is movable out of the deck to close said rear opening or into the deck to uncover the same while the body portion of the top remains fixed in its raised position.

13. In a vehicle body, the combination comprising a passenger compartment with a rear seat therein, a rear deck behind said seat and having a fixed outer wall, a rigid top movable between a raised position over said compartment and a lowered position within said deck, the top having a rear portion with upstanding side walls and an outrigger portion of greater length than said rear portion, supporting and guiding structure for said top, said wall of the deck providing an opening of less longitudinal extent than that of the outrigger portion, the lowered top being upwardly and forwardly inclined at an acute angle to its raised position and having its rear portion in the back part of the deck and the front end of its outrigger portion juxtaposed to the upper part of said seat, the rising top having its rear portion movable directly into engagement with edge portions of the deck wall adjoining said opening so that the raised top may act as a closure for the opening, said supporting and guiding structure being constructed so that the center of gravity of the top in passing from lowered to raised position is constrained to follow a path having a forward and upward inclination with its horizontal component distinctly greater than its vertical component, the top being positioned substantially parallel to its lowered position as its outrigger portion passes thru said opening, the top swinging about a forwardly moving axis ahead of its rear portion as the latter approaches the edge portions of the deck wall adjoining said opening so that the rear of the top has a greater upward component of movement than the remainder thereof, said structure being constructed so that clearance is positively maintained between the top and rear edge of said opening as the outrigger portion is passing thru said opening.

RAYMOND L. CARR.